United States Patent [19]

Facklam

[11] Patent Number: 4,982,406
[45] Date of Patent: Jan. 1, 1991

[54] SELF-INJECTION LOCKING TECHNIQUE

[75] Inventor: Roger L. Facklam, Albuquerque, N. Mex.

[73] Assignee: The United States of America as represented by the Secretary of the Air Force, Washington, D.C.

[21] Appl. No.: 415,520

[22] Filed: Oct. 2, 1989

[51] Int. Cl.$^5$ ............................................. H01S 3/098
[52] U.S. Cl. ........................................ 372/18; 372/25; 372/32; 372/99; 372/103; 372/106
[58] Field of Search ........................ 372/18, 20, 32, 25, 372/92, 98, 99, 103, 108, 106

[56] References Cited

U.S. PATENT DOCUMENTS

| | | | |
|---|---|---|---|
| 3,999,146 | 12/1976 | Lang et al. | 331/94.5 M |
| 4,227,159 | 10/1980 | Barrett et al. | 331/94.5 P |
| 4,264,870 | 4/1981 | Avicola et al. | 330/4.3 |
| 4,490,823 | 12/1984 | Komine et al. | 372/95 |
| 4,635,266 | 1/1987 | Facklam | 372/32 |
| 4,686,485 | 8/1987 | Goldberg et al. | 330/4.3 |
| 4,689,794 | 8/1987 | Brosnan | 372/18 |
| 4,726,011 | 2/1988 | Ih et al. | 370/3 |
| 4,755,016 | 7/1988 | De Loach, Jr. et al. | 350/96.16 |
| 4,768,852 | 9/1988 | Ih | 350/96.13 |

OTHER PUBLICATIONS

T. McKee, "Spectral-Narrowing Technique for Excimer Laser Oscillators", *Canadian Journal of Physics*, vol. 63, 1985, pp. 214-219.
T. McKee et al., "Performance of a Novel Injection-Locked Excimer Laser", *J. Appl. Phys.*, 56(7), Oct. 1, 1984, pp. 2170-2173.
C. Buczek et al., "Laser Injection Locking", *Proceedings of the IEEE*, vol. 61, No. 10, Oct. 1973, pp. 1411-1431.
I. Bigio et al., "Injection-Locking Unstable Resonator Excimer Lasers", *IEEE JQE*, vol. QE-19, No. 9, Sep. 1983, pp. 1426-1436.
G. Zhang et al., "The Influence of the Beam Expanding . . . ", *Optics Communication*, vol. 40, No. 1, Dec. 1, 1981, pp. 49-53.
D. Bradley et al., "High Efficiency Interferometric Tuning of Flashlamp Pumped Dye Lasers", *Optics Communication*, vol. 4, No. 2, Oct. 1971, pp. 150-153.

Primary Examiner—James W. Davie
Attorney, Agent, or Firm—William G. Auton; Donald J. Singer

[57] ABSTRACT

A self-injection locking system is disclosed that internally narrows the prepulse of a laser cavity before it is replicated as the laser output using: two quarter wave plates, an air spaced etalon, and a polarizing beam splitter. The air spaced etalon will separate the off-center frequency signals from the center frequency signals of the prepulse by inducing a phase shift. Following this, the polarizing beam splitter impedes the off-center frequency signals by a power loss of about ten percent while the center frequency signals are unaffected. In operation, this can cause the off-center frequency signals to fail to reach the threshold at which stimulated emission takes place. The result is that the laser replicates only the center frequency signals as the laser output.

12 Claims, 3 Drawing Sheets

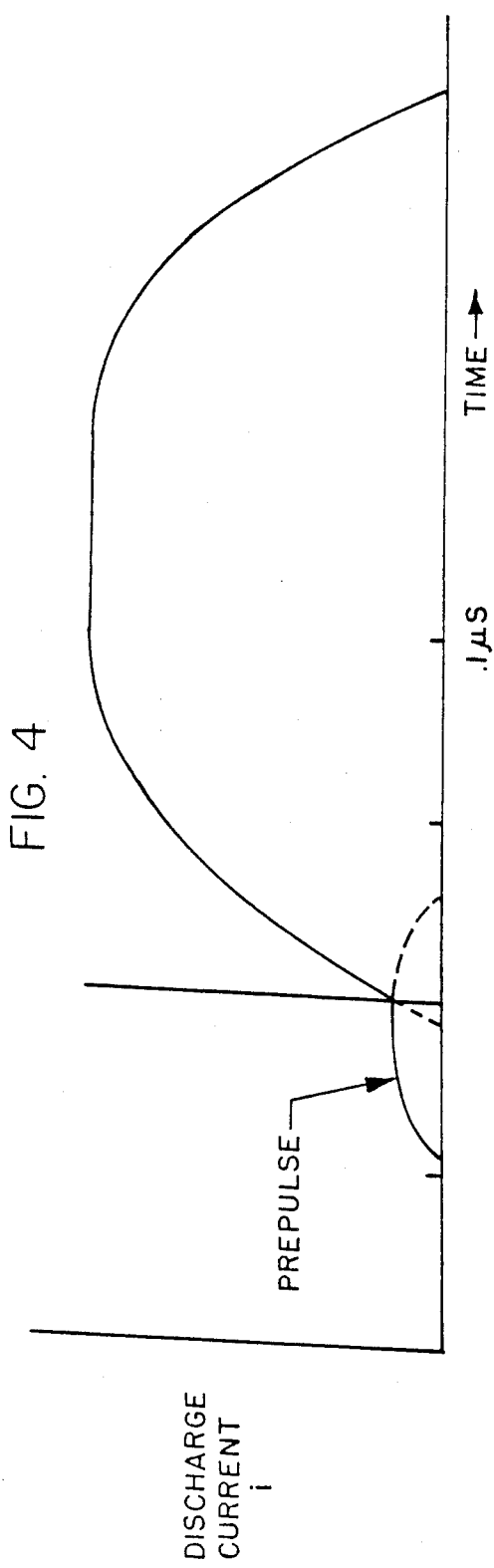

4,982,406

SELF-INJECTION LOCKING TECHNIQUE

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to lasers, and more specifically the invention pertains to a system for self-injection locking a single laser for reducing the linewidth of the laser's output.

Injection-locking is a phase synchronization technique that is commonly performed with two lasers. Self-injection locking has been accomplished with a single laser but does not reduce the linewidth of the output as narrowly as injection with two lasers. The present invention uses self-injection locking of a single laser using a prepulse to establish a low power beam that is line narrowed before self-injection to generate a high power pulse. The result is a self-injection locking system which outputs a narrow linewidth laser.

Laser injection locking was first demonstrated by Stover and Steier who injected the beam of one very stable Fabry-Perot laser into the resonator of a second very stable Fabry-Perot laser. They measured the locking range as a function of drive level of the locking signal and found that the experimental results compared favorable with the classical theory. Each of the two lasers operated in as single frequency mode. The length of each laser cavity could be adjusted to tune the frequency by means of a mirror mounted on a piezoelectric transducer. By sweeping one laser, the injection-locked region (or the frequency range free from the beating which is the result of simultaneous operation at the self-oscillation and driven frequency) could be measured. The locking bandwidths which ranged from 0.1 to 1.0 MHz were found to be proportional to the square root of the injection power.

With the advent of laser telescopes and similar applications of high powered lasers has come the need for long coherence lengths required for non-linear optical effects. Non-linear optical efforts require coherence lengths on the order of centimeters. The coherence length of the laser can be increased by line narrowing. Current methods use injection locking to narrow the spectral output. This is accomplished with a reference oscillation (RO) whose beam is injected into a power oscillator (PO). This method allows 60 percent of the power to be delivered in a 50 MHz bandwidth for a 20 ns pulse. This reduction in bandwidth is called line narrowing. The optical conversion efficiency for 2nd harmonic generation improves as the square of the coherence length. This method requires two or more lasers.

A second method is self-injection locking which requires only one laser. However, it requires a fraction of the beam to be sent into a frequency discriminating section of the laser. The frequency discriminating component can be prisms, gratings, or etalons. The self injection locking reduces the linewidth better than a geometrical analysis predicts, but still not nearly as narrow as true injection locking.

The task of providing a self-injection locking system which yields spectrally narrow laser outputs from high powered lasers is alleviated, to some extent, by the systems disclosed in the following U.S. Patents, the disclosures of which are incorporated herein by reference:

U.S. Pat. No. 4,635,266 issued to Facklam;
U.S. Pat. No. 4,227,159 issued to Barret et al;
U.S. Pat. No. 3,999,146 issued to Lang et al;
U.S. Pat. No. 4,264,870 issued to Avicola et al;
U.S. Pat. No. 4,490,823 issued to Komine et al;
U.S. Pat. No. 4,686,485 issued to Goldberg et al;
U.S. Pat. No. 4,689,794 issued to Brosnan;
U.S. Pat. No. 4,726,011 issued to Ih et al;
U.S. Pat. No. 4,755,016 issued to DeLoach et al; and
U.S. Pat. No. 4,768,852 issued to Ih.

All of the above-cited patents disclose prior art laser injection systems which can be improved by the present invention.

The Facklam patent discloses a dispersion control system for a laser. Barrett et al disclose an injection locking system using two lasers and tuning etalons. The semi-conductor laser of Lang et al is used with several injection locking devices, including both a modulating laser element and an injection laser element.

Avicola et al teach the use of an automatic locking system for an injection locked laser. Komine et al disclose an injection locked unstable laser. Goldbert et al disclose the optical injection locking of laser diode arrays.

The Brosnan patent teaches the conventional injection locking technique using two lasers. The injection laser's output enters the rear reflector of a xenon chloride laser to slightly shift its gain profile towards longer wavelengths.

The Ih patent discloses modulators and injection locked lasers.

The following technical articles are also pertinent to the present invention, and are incorporated herein by reference:

"Laser Injection Locking" by C. Buczek et al, Proceedings of the IEEE, vol. 61, No. 10, October 1973;

"Injection-Locking Unstable Resonator Excimer lasers," *IEEE Journal of Quantum Electronics*, Vol. QE-19, No. 9, Sep 83;

"The Influence of the Beam Expanding Prism in a Dye Laser Resonator on the Linewidth and its Dependence on the Expansion Ration," *Optics Communication*, Vol. 40, No. 1 P. 9, 1 Dec 81;

"Spectrally Narrow Pulsed Dye Laser Without Beam Expander," *Applied Optics*, Vol. 21, No. 17, p. 3065, 1 Sep 82;

"High Efficiency Interferometric Tuning of Flashlamp Pumped Dye Lasers," *Optics Communication*, Vol 4, No. 2, Oct 71;

"Spectral-narrowing techniques for excimer laser oscillators," *Canadian Journal of Physics*, Vol. 63, p. 214-219, 1985; and "Performance of a Novel Injection-locked Excimer Laser," *Journal of Applied Physics*, Vol. 56, No. 7, p. 2172; 10 Oct. 84.

All of the references cited above teach state-of-the-art laser injection locking techniques. While these references are instructive, a need remains to provide a system for self-injection locking a single laser for reducing linewidth of the laser's output. The present invention is intended to satisfy that need.

SUMMARY OF THE INVENTION

The present invention includes a self-injection locking system which yields spectrally narrow laser outputs from high powered lasers using: a power source, a gain cell laser oscillator, two mirrors, a polarizing beam splitter, two quarter wave plates, and an air spaced etalon. In this configuration, the two mirrors encompass: the gain cell, the polarizing beam splitter, and the etalon as well as both quarter wave plates.

The gain cell laser oscillator generates a prepulse which will be replicated as the laser output when the power source provides a high power pulse to the laser oscillator. Prior to that point, the prepulse can be considered a small signal which is reflected back and forth between the two mirrors.

As with all Fabry-Perot laser cavities, this laser system has a threshold which must be surpassed before stimulated emission is reached. As in most lasers, when the power source provides a high power pulse to the gain cell, the prepulse will be replicated as the laser output. However, this system differs from most systems in that it has an internal spectral narrowing elements consisting of the air spaced etalon, both quarter wave plates, and the polarizing beam splitter which narrow the prepulse to provide a high loss to off-center frequency signals in the prepulse as described below. Since the prepulse is spectrally line narrowed, and since the laser output will replicate this prepulse, the laser output will be spectrally narrowed by these internal elements.

The etalon, quarter wave plates and polarizing beam splitter are spectral narrowing elements that separate the off-center frequency signals of the prepulse from the center frequency signal by an induced phase shift. This allows the polarizing beam splitter to effectively extract the off-center frequency signals and it throws out unwanted polarizations as follows. As the prepulse reflects back and forth between the two mirrors, the center frequency signal experiences no losses, while the off-center frequency signals experience a 10 percent loss of power. With such losses applied to off-center signals, it is possible to keep them from reaching the threshold at which lasing commences as the center frequency signals experience lasing.

Since the off-center frequency signals don't lase, the laser output (which replicates the prepulse) will be spectrally line narrowed as a direct result of the spectral narrowing performed on the prepulse.

The second of the two mirrors has a central aperture which allows the laser output to exit the laser system once the power pulse is applied to the gain cell laser oscillator.

Another embodiment of the invention uses: three mirrors, a gain cell laser oscillator, a polarizing beam splitter, two quarter wave plates and an air spaced etalon. The internal line narrowing elements operate as described above, but the laser output of the gain cell passes around the edges of the mirror which is on the output side of the gain cell, while the line narrowing elements are on the opposite side of the gain cell from the output mirror. This second embodiment is preferred over the one discussed above previously since it has an output end that is relatively clear of optics. This embodiment will minimize the optical losses at the output of the laser system.

It is an object of the present invention to provide a self-injection locking system which uses a single laser with internal line narrowing elements that narrow lasers prepulse and consequently the laser's output.

It is another object of the present invention to provide a self-injection locking system which does not use external optical elements to perform injection of a desired narrow signal, but uses internal elements that spectrally line narrow the prepulse by providing losses to undesired off-center frequency signals.

These together with other objects, features and advantages of the invention will become more readily apparent from the following detailed description when taken in conjunction with the accompanying drawings wherein like elements are given like reference numerals throughout.

DESCRIPTION OF THE DRAWINGS

FIG. 4 is a chart of the laser discharge current of the system of FIG. 2.

DETAILED DESCRIPTION OF THE PREFERRED EMBODIMENT

The present invention includes a self-injection laser locking system for reducing the linewidth of a laser's output.

Figure 1:
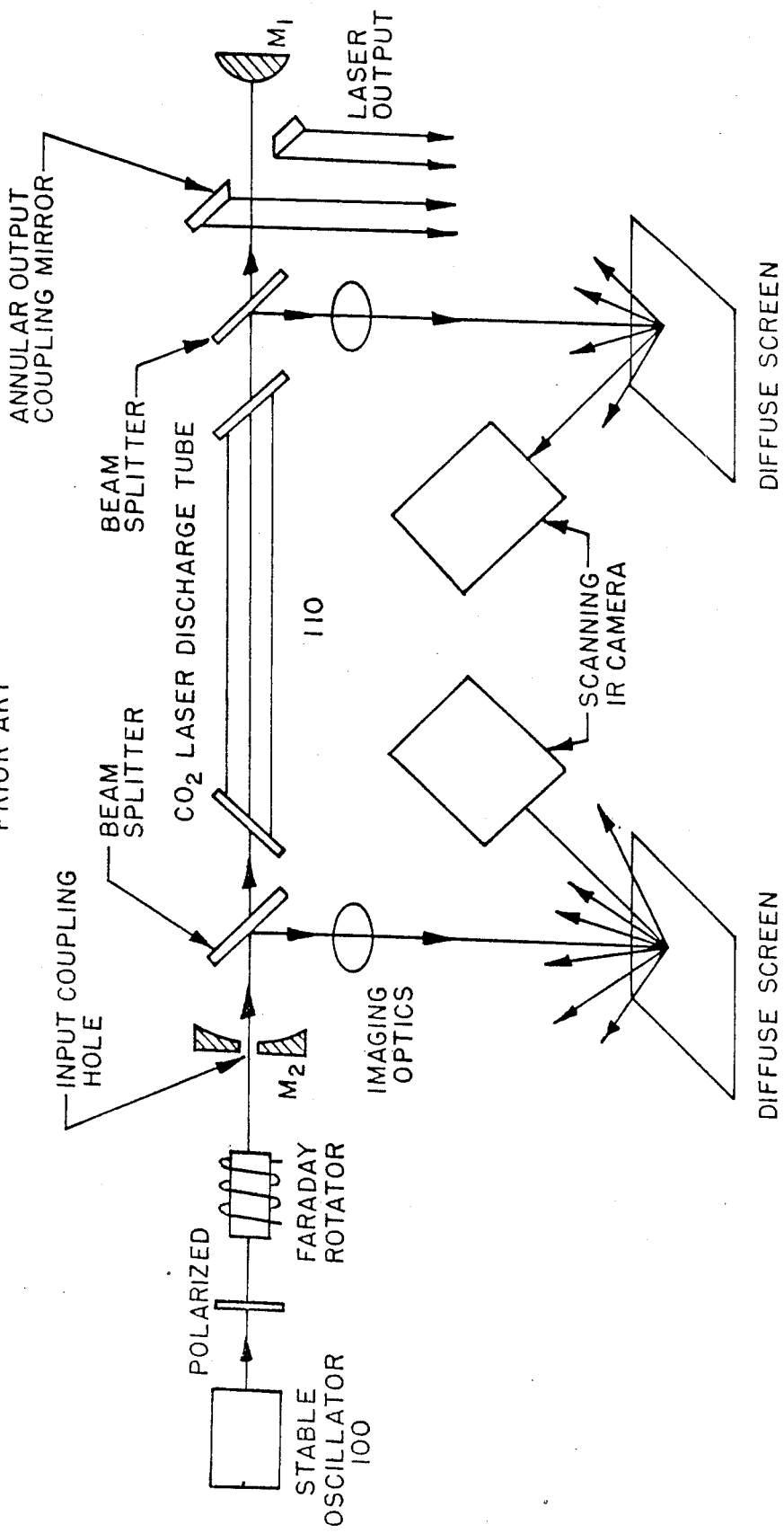
FIG. 1 is an illustration of a prior art laser injection locking system which uses two laser.

The reader's attention is now directed towards FIG. 1, which is an illustration of a prior art injection locking system which uses two lasers. In the system of FIG. 1, injection locking is used to reduce the spectral output of a $CO_2$ laser output.

Self-injection systems require only one laser, but they are normally characterized as having a complex optical chain to extract and then inject a self-generated reference signal. Such complex optical chains always are a source of potential losses in signal quality and power, but these optical chains have been, up until now, essential if one were to use a laser injection system.

The present invention presents a new approach to laser self-injection locking techniques. Rather than inject a reference signal with a desired narrow frequency the present invention extracts undesired off-frequency signal components. The principle behind this invention is as follows.

Lasers are all characterized as having a threshold which must be surpassed in order to exhibit stimulated emission of radiation known as lasing. If the internal optical characteristics of a Fabry-Perot laser cavity can be adjusted such that a desired narrow frequency exhibits no losses, while undesired frequency signals experience a ten percent power loss, then the off-center frequencies will not lase. The system of the present invention accomplishes this extraction without complex external optical chains in the manner described below.

Figure 2:
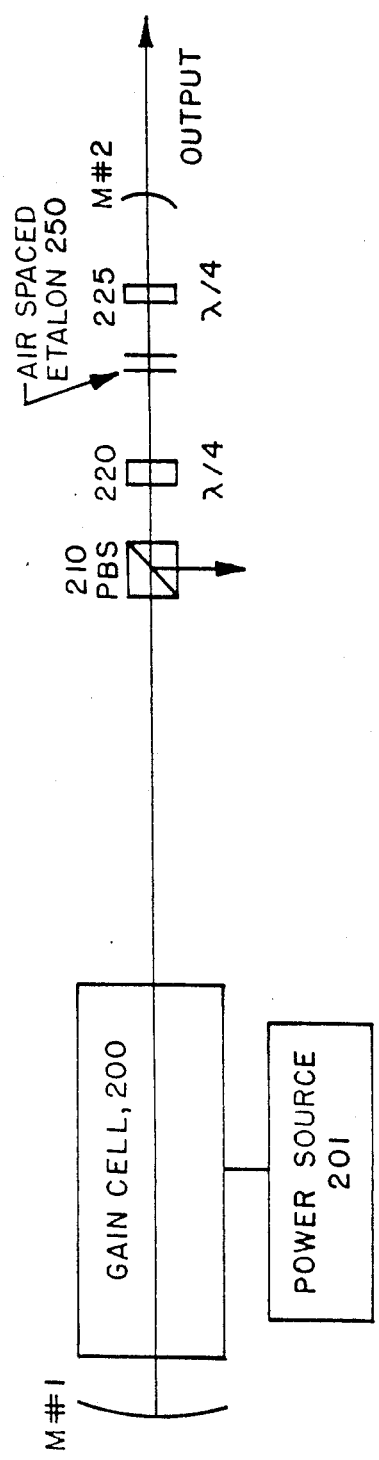
FIG. 2 is an illustration of an embodiment of the present invention.

The reader's attention is now directed towards FIG. 2 which is an illustration of an embodiment of the present invention. The system of FIG. 2 is a self-injection locking system which yields spectrally narrow laser outputs using: a gain cell laser oscillator 200, a polarizing beam splitter 210, two quarter wave plates 220 and 225, an air spaced etalon 250, and two mirrors M#1 and M#2.

In this embodiment the two mirrors encompass: the gain cell 200, the polarizing beam splitter 210, the etalon 250 as well as both quarter wave plates. As the prepulse reflects back and forth in between the two mirrors, the air spaced etalon 250 and quarter wave plates produce a slight phase shift between a narrow frequency of the prepulse which separates the center frequency from the broader off-frequency signals to the prepulse. As the prepulse continues to bounce between the two mirrors, the polarizing beam splitter provides a high loss to off-center frequency signals by extracting 10% of the power of these signals. Note that all of the individual components of FIG. 2 (the gain cell, mirrors, etalon, beam splitter and quarter wave plates) are commercially produced by companies such as Spectra Physics, but they are not in current use by others in the self-injection configuration of FIG. 2, nor in the manner described below.

In operation, the prepulse bounces back and forth in the cavity until a large power pulse is applied to the gain cell. Since the prepulse has been narrowed and ode matched, and since this small beam is replicated as the laser is pulsed, the laser output will be spectrally narrowed.

The system of FIG. 2 has several advantages over the system of FIG. 1. First, the system of FIG. 2 only uses a single laser. From a reliability standpoint, a fewer number of components is always preferable in a system. Second, the system of FIG. 2 does not have the complex external optical chain found in the system of FIG. 1. In operation, the self-injection locking system of FIG. 2 reduces the linewidth better than a geometrical analysis predicts, as discussed below.

The actual linewidth of a laser is called the active linewidth and the computed linewidth is called the passive linewidth. Line narrowing is a form of self-injection locking. The injection locking takes place in approximately the first 20 ns of the laser pulse. After this time, the strong cavity mode is established and the injection signal becomes ineffective. At first it would appear that the narrowing is generated by taking the transmission curve for the Fabry-Perot to the nth power. However, this would only give a factor of 21.5 improvement in 1.072 s (for RT=6.7 ns). But if one uses the improvement in contrast as follows $$C = C_o^n \qquad \text{Equation 1}$$

where C is the contrast and n is the number of passes through the Fabry-Perot.

The contrast can be written in terms of parameter F as follows $$C = 1 + F \qquad \text{Equation 2}$$

The finesse is given by:

$$F = \frac{2\pi}{\epsilon} = \frac{\pi \sqrt{F}}{2} = \frac{\pi \sqrt{(C-1)}}{2} \qquad \text{Equation 3}$$

The bandwidth is given by:

$$BW = FSR/F \qquad \text{Equation 4}$$

where BW is the bandwidth and FSR is the free spectral range.

$$\text{So } BW_{act} = FSR/F_{act} \qquad \text{Equation 5}$$

where $$F_{act} = \frac{\pi \sqrt{C_o^{neff} - 1}}{2} \qquad \text{Equation 6a}$$

$$\frac{\pi \sqrt{C_o^{neff}}}{2} \quad C_o^{neff} \gg 1 \qquad \text{Equation 6b}$$

$$\frac{\pi \sqrt{F_o^{neff}}}{2} \quad C_o^{neff} \gg 1 \qquad \text{Equation 6c}$$

and $C = C_o^{neff}$ and $C_o$ is the single pass contrast and where $N_{eff} = \tau_{BU}/\tau_{RT}$ where $\tau_{BU}$ is the build up time for the strong cavity mode and $\tau_{RT}$ is the round trip cavity time.

Figure 3:
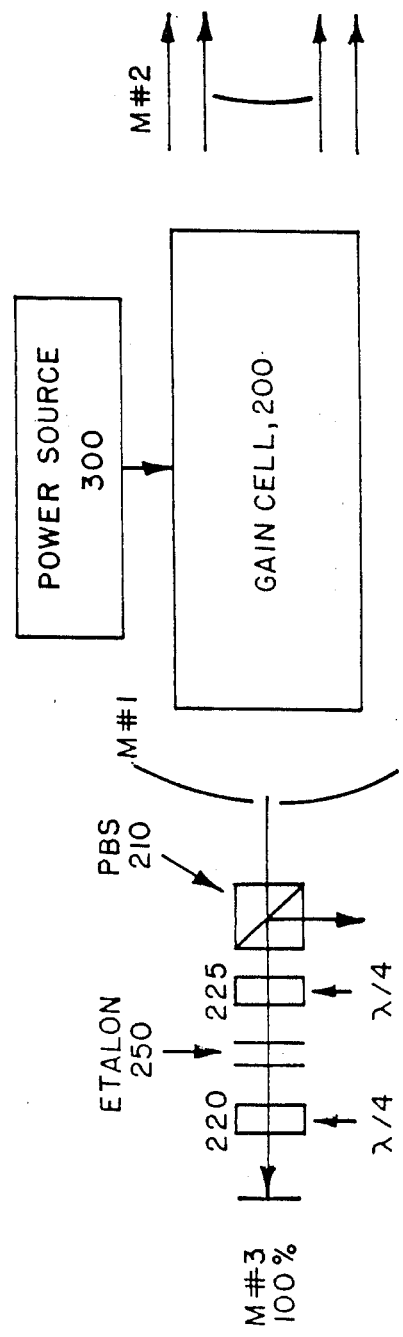
FIG. 3 is an illustration of the preferred embodiment of the present invention.

The reader's attention is now directed towards FIG. 3, which is a schematic of the preferred embodiment of the present invention. The system of FIG. 3 resembles that of FIG. 2 in that it requires only one laser, and that it requires a fraction of the beam to be sent into a frequency discriminating section of the laser. The frequency discriminating component can be prisms, gratings, or etalons.

The system of FIG. 3 is a self-injection locking system which yields spectrally narrow laser outputs using: a gain cell laser oscillator 200, a polarizing beam splitter 210, two quarter wave plates 220 and 225 an air spaced etalon 250, and three mirrors M#1, M#2, and M#3.

In operation, the gain cell 250 generates a prepulse which will be replicated as the laser output when a high power pulse is applied to the laser. Prior to that point in time, the prepulse can be considered a small laser signal which is reflected back and forth between mirrors M#2 and M#3 in a large laser cavity.

Mirror M#1 has a central aperture which allows the Prepulse to exit the gain cell 250 where the etalon 250, quarter wave plates 220 and 225, and polarizing beam splitter operate as internal spectral narrowing elements as described above. When power is applied to the gain cell 250 by the pump power source 300, the gain cell will generate a laser output that replicates the prepulse beam. Since the prepulse beam has been spectrally narrowed, the present invention will cause the gain cell 200 to generate a laser output that is also spectrally narrowed.

The output of the gain cell 200 in FIG. 3 passes around the edges of the second mirror M#2, and this is an important feature for the following reason. The advantage that the system of FIG. 3 has over that of the system of FIG. 2 is that the FIG. 3 has an output end that is relatively clear of optics. This configuration will minimize the optical losses at the output of the laser system.

FIG. 4 is a chart the laser discharge current of the system of FIG. 2 showing a magnified prepulse next to the discharge current of the laser pulse. The vertical axis is in amperes and the horizontal axis is in microseconds.

The line-narrowed prepulse of FIG. 4 has about a 40 nanosecond pulsewidth, which is considerably narrowed. As shown in FIG. 4, the laser discharge replicates the prepulse. This technique establishes a low power beam with a stable phase front and narrow linewidth prior to the main laser pulse. This allows all of the main pulse to be spectrally narrow as well as having a good beam quality.

The theory shows the line narrowing is only effective for $\tau_{BU}$, so the pre-pulse only needs to be approximately $T_{BU}$ long. However, once established, the narrowing elements help maintain the linewidth. This technique allows active injection locking with only one laser or active self-injection locking.

Note this technique should be useful for combing and line narrowing multiple laser cavities. An output from each cavity could be fed through the same narrowing system and back into each laser. This would establish a common line narrowed mode for the power to be channelled into after t=o.

As described above, the self-injection laser locking system of FIGS. 2 and 3 appears to be a new laser configuration which has an internal means for spectrally narrowing its prepulse. This is an accurate assessment for most categories of traditional laser systems including chemical ($CO_2$ and HeNe lasers) and semiconductor laser systems. However, the invention can also be considered a process for improving a chemical laser's performance by spectrally narrowing the chemical laser's prepulse before it is replicated as the laser's output. This process is performed by adding the airspaced etalon, quarter wave plates and polarizing beam splitter to an ordinary gain cell for a chemical laser as described above for FIGS. 2 and 3. Chemical lasers are singled out for improvement since they have space around their laser cavity interiors that permits the addition of these optical elements between their output mirrors. Semiconductor lasers are solid state components in which the gain cell and output mirrors are one integral unit and therefore provides no access for such additional elements.

While the invention has been described in its presently preferred embodiment, it is understood that the words which have been used are words of description rather than words of limitation and that changes within the purview of the appended claims may be made without departing from the scope and spirit of the invention and its broader aspects.

What is claimed is:

1. A self-injection laser locking system comprising:
   a power source which outputs a high power pulse;
   a first and a second mirror, said second mirror having a central aperture;
   a gain cell which is fixed between said first and second mirrors and which generates a prepulse which will be replicated as a laser output when said gain cell receives said high power pulse from said power source, said gain cell thereby amplifying said prepulse above a threshold at which stimulated emission takes place, said laser output then exiting through said central aperture of said second mirror; and
   an internal means for spectrally narrowing said prepulse so that said laser output will be line narrowed when it replicates the prepulse, said internal spectrally narrowing means being fixed between said gain cell and said second mirror and conducting a center frequency signal of said prepulse therebetween with no losses while providing a power loss to off-center frequency signals so that said off-center frequency signals fail to reach said threshold at which stimulated emission takes place, said laser output thereby replicating only said center frequency signals and having a reduced linewidth when compared with an uncorrected laser output which replicates both said center frequency signals and said off-center frequency signals, said uncorrected laser output being an output produced by said gain cell when it operates without said spectrally narrowing means.

2. A self-injection laser locking system, as defined in claim 1, wherein said spectrally narrowing means comprises:
   a first and a second quarter wave plate which are fixed between said gain cell and said second mirror so that said prepulse passes therebetween;
   an air spaced etalon which is fixed between said first and second quarter wave plates to produce a slight phase shift between said off-center frequency signals and said center frequency signals of said prepulse when said prepulse passes between said first and second quarter wave plates; and
   a means for providing said power loss to said off-center frequency signals after they are separated from said center frequency signals by said air spaced etalon, said providing means thereby inhibiting said off-center frequency signals from reaching said threshold at which stimulated emission occurs.

3. A self-injection laser locking system, as defined in claim 2, wherein said providing means comprises a polarizing beam splitter which is fixed between said gain cell and said first quarter wave plate so that it can extract said off-center frequency signals when they are separated from said center frequency signals by said slight phase shift induced by said air spaced etalon.

4. A self-injection laser locking system comprising:
   a power source which outputs a high power pulse;
   a first, a second and a third mirror, said first mirror having a central aperture;
   a gain cell which is fired between said first and second mirrors and which generates a prepulse which will be replicated as a laser output when said gain cell receives said high power pulse from said power source, said gain cell thereby amplifying said prepulse above a threshold at which stimulated emission takes place, said prepulse normally travelling back and forth between said second mirror and said gain cell, through the central aperture of the first mirror to the third mirror in turn, said laser output exiting out said gain cell around said second mirror's edges when high power pulse is applied to said gain cell; and
   an internal means for spectrally narrowing said prepulse so that said laser output will be line narrowed when it replicates the prepulse, said internal spectrally narrowing means being fixed between said first and said third mirrors and conducting a center frequency signal of said prepulse therebetween with no losses while providing a power loss to off-center frequency signals so that said off-center frequency signals fail to reach said threshold at which stimulated emission takes place, said laser output thereby replicating only said center frequency signals and having a reduced linewidth when compared with an uncorrected laser output which replicates both said off-center frequency signals plus said center frequency signals, said uncorrected laser output being an output produced by said gain cell when it operates without said spectrally narrowing means.

5. A self-injection laser locking system, as defined in claim 4, wherein said spectrally narrowing means comprises:
   a first and a second quarter wave plate which are fixed between said gain cell and said third mirror so that said prepulse passes therebetween;

an air spaced etalon which is fixed between said first and second quarter wave plates to produce a slight phase shift between said off-center frequency signals and said center frequency signals of said prepulse when said prepulse passes between said first and second quarter wave plates; and a means for providing said power loss to said off-center frequency signals after they are separated from said center frequency signals by said air spaced etalon, said providing means thereby inhibiting said off-center frequency signals from reaching said threshold at which stimulated emission occurs.

6. A self-injection laser locking system, as defined in claim 5, wherein said providing means comprises a polarizing beam splitter which is fixed between said gain cell and said first quarter wave plate so that it can extract said off-center frequency signals when they are separated from said center frequency signals by said slight phase shift induced by said air spaced etalon.

7. A self-injection laser locking system, as defined in claim 6, wherein said first mirror has said central aperture which allows said prepulse to reflect back and forth between said second and said third mirrors, and wherein said first mirror has a diameter that extends beyond the edges of said second mirror to reflect said laser output generated by said gain cell around said second mirror's edges when said high power pulse is applied to said gain cell.

8. A process of improving a chemical laser's performance by spectrally narrowing the chemical laser's prepulse which is generated by said chemical laser's gain cell, said prepulse being replicated as said chemical laser's output when said gain cell receives a high power pulse from a power source, said process thereby spectrally narrowing said chemical laser's laser output wherein said process includes the steps of:

separating all off-center frequency signals of said prepulse from a center frequency signal by inducing a phase shift separation between said off-center frequency signals and said center frequency signal;

providing a power loss to said off-center frequency signals so that they fail to reach a laser threshold at which said gain cell achieves stimulated emission of said prepulse to produce said laser output; and maintaining said center frequency signals in said prepulse without a power loss so that said prepulse is spectrally narrowed, and said laser output replicates said center frequency signal when said gain cell receives said high power pulse.

9. A process, as defined in claim 8, wherein said chemical laser has a first and second mirror with said gain cell therebetween such that said second mirror has a central aperture through which said laser output exits, and wherein said separating step comprises adding a first and a second quarter wave plate with an air spaced etalon therebetween into said chemical laser between said gain cell and said second mirror to induce thereby said phase shift separation between said off-center frequency signals and said center frequency signal as said prepulse passes through said first and second quarter wave plates and said air spaced etalon.

10. A process as defined in claim 9, wherein said providing step comprises adding a polarizing beam splitter between said gain cell and said first quarter wave plate to extract said off-center frequency signals from said prepulse after said first and second quarter wave plates and said air spaced etalon have induced said phase shift separation therein, said polarizing beam splitter thereby inhibiting said off-center frequency signals from reaching said threshold at which stimulated emission takes place in said chemical laser.

11. A process, as defined in claim 8 wherein said chemical laser has a first, a second and a third mirror with said gain cell fixed between said first and second mirrors such that said prepulse is emitted out through said gain cell through an aperture in said first gain cell to said third mirror and back, and wherein said separating step comprises adding a first and a second quarter wave plate with an air spaced etalon therebetween into said chemical laser between said first and said third mirror to induce thereby said phase shift separation between said off-center frequency signals and said center frequency signal as said prepulse passes through said first and second quarter wave plates and said air spaced etalon.

12. A process as defined in claim 11, wherein said providing step comprises adding a polarizing beam splitter between said gain cell and said first greater wave plate to extract said off-center frequency signals from said prepulse after said first and second quarter wave plates and said air spaced etalon have induced said phase shift separation therein, said polarizing beam splitter thereby inhibiting said off-center frequency signals from reaching said threshold at which stimulated emission takes place in said chemical laser.

* * * * *